April 7, 1959 P. PALLUEL 2,881,348

DELAY LINE FOR TRAVELING WAVE TUBES

Filed Dec. 11, 1953 3 Sheets-Sheet 2

United States Patent Office 2,881,348

Patented Apr. 7, 1959

2,881,348

DELAY LINE FOR TRAVELING WAVE TUBES

Pierre Palluel, Paris, France, assignor to Compagnie Generale de Telegraphie Sans Fil, a corporation of France Application December 11, 1953, Serial No. 397,617

Claims priority, application France December 19, 1952

10 Claims. (Cl. 315—3.6)

It is known in ultrashort wave techniques to use devices known as delay lines. These delay lines are more particularly used in amplifier or oscillator tubes of the travelling wave type. As is known, such tubes comprise a cathode for emitting an electron beam, and an electron optical system for focusing this beam so that it is propagated parallel to the axis of an electrode which has a high potential relative to that of the cathode and is constituted by a delay line. This electrode is coupled, at the end thereof adjacent the cathode, to a transmission line which feeds into the electrode the electromagnetic wave to be amplified, or receives the wave produced in the case of an oscillator tube. In the case of an amplifier tube an outlet is provided at the other end of the delay line.

It is known that if the phase velocity of the wave which is propagated in the delay line along the axis thereof is substantially equal to the velocity of the electrons of the beam, an interaction occurs between the latter and the wave. It is this interaction which causes the amplification of the incoming wave in the case of a travelling wave amplifier tube and the production of the wave in the case of a travelling wave oscillator tube.

The delay lines used in such tubes are of various kinds, depending on the technological characteristics and the performances desired from the tube for which they are adapted.

It is known to use, in particular in tubes adapted to develop high power, delay lines of the interdigital type. As is known, a delay line of this kind is formed of two comblike members, each one of which comprises an elongated base or body provided with a number of fingers. The respective fingers of the two combs are interdigitated.

The present invention has for its object to provide a delay line of the interdigital type which is more particularly adapted to be used in travelling wave tubes.

The interdigital line according to the invention comprises, provided in each finger of the two combs, apertures so disposed as to face each other and thus form one or more channels or passage-ways which are parallel to the axis of the line and are adapted to permit an electron beam to pass through the interior of the delay line, i.e. where the H.F. field, of which the delay line is the seat, is the most intense. In the case of conventional interdigital lines this beam is propagated outside the line.

The invention will be better understood from the following description with reference to the diagrammatic drawings wherein.

Like reference numerals refer to like elements throughout the drawings.

Figure 1:
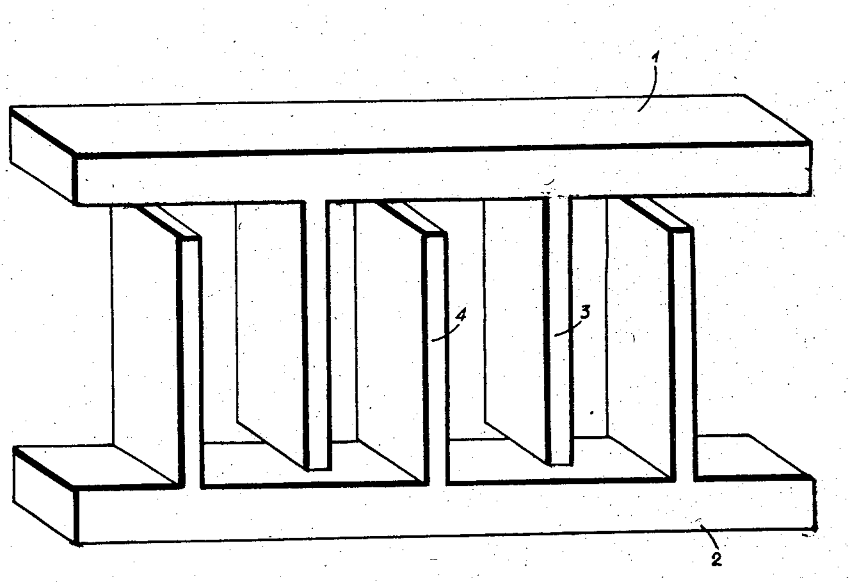
Fig. 1 shows in perspective an interdigital line of known type.

The interdigital delay line of known type shown in Fig. 1 comprises two identical metal combs having bodies 1 and 2 and fingers 3 and 4 which are parallelipipedic in shape and are symmetrically interdigitated.

This kind of line functions, in so far as the wave of which it is the seat is concerned, as a folded Lecher line. The two conductors of this line are obviously constituted by the facing sides of the two families of fingers 3 and 4.

It is known that lines of this type have the advantage of permitting, in travelling wave tubes, the use of flat electron beams and the easy removal of heat which is produced for example by the impact of badly focused electrons. However, they have the disadvantage of not allowing the electrons to propagate in the space comprised between the fingers 3 and 4, where the electromagnetic field of the wave is the most intense, and the beam must be propagated outside this space. In other words, the interaction does not occur under the best conditions, the coupling impedance, as is known, is relatively weak and in consequence the gain of the tube per unit length, measured along its axis, is low. To attain a sufficient total gain it is necessary to use long tubes which require complicated focusing systems.

Figure 2:
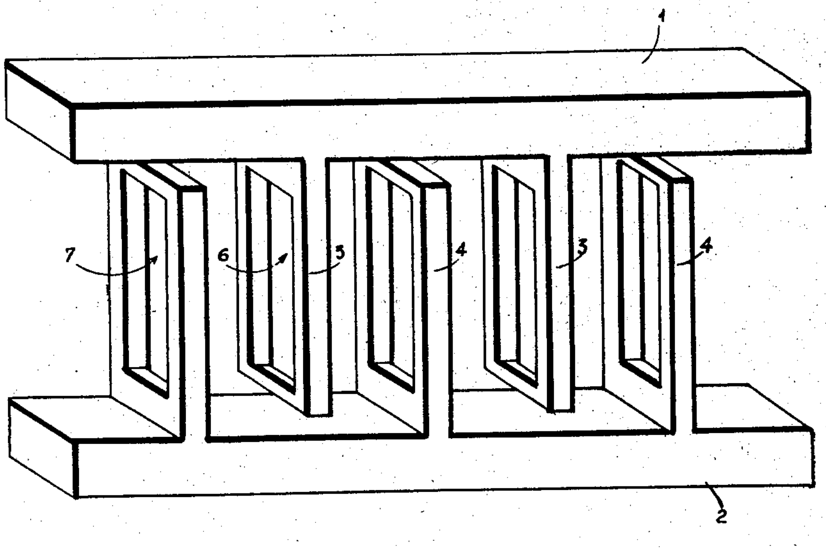
Fig. 2 shows in perspective an embodiment of an interdigital line having fingers which are apertured over a part of their area, in accordance with the invention.

Fig. 2 illustrates an interdigital line according to the invention. The respective fingers 3 and 4 extending from the two bodies 1 and 2 have rectangular apertures 6. These apertures, which extend over a part of the height of the fingers, are so disposed as to face one another and thereby form a channel 7 through which an electron beam may pass.

Figure 3:
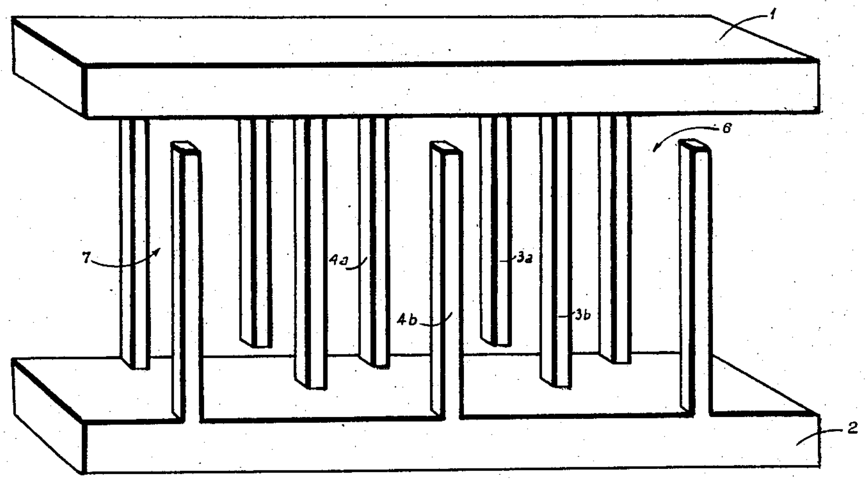
Fig. 3 shows in perspective an embodiment of a line according to the invention in which the fingers are apertured over their entire height, thereby forming two parallel rows of parallel extensions.

In the embodiment shown in Fig. 3, the apertures 6 are provided over the entire height of the fingers 3 and 4. The line comprises, therefore, two rows of thin extensions, one row comprising fingers *4a*, *3a* and the other comprising fingers *4b*, *3b*. Such an interdigital line functions substantially in the manner of two interdigital lines disposed in parallel. The electron beam is propagated in the space 7 between the two rows of extensions.

It is possible to visualize a line having more than two rows, for example four rows of extensions such as those illustrated in Fig. 3. Such a line is diagrammatically shown in perspective in Fig. 4. The extensions related to the elongated body 1a are designated by reference numerals *3a*, *3b*, *3c* and *3d* and the fingers related to the body 2a by *4a*, *4b*, *4c* and *4d*. Such a delay line is equivalent to the delay line of Fig. 1 in which three apertures are provided in each of the fingers 3 and 4.

It is obvious that these delay lines may be constructed in a number of ways. For example, the two elongated bodies and the rows of fingers carried by the latter may be machined out or cast. Further, the fingers may be fixed to the bodies by brazing or in any other suitable way.

Figure 5:
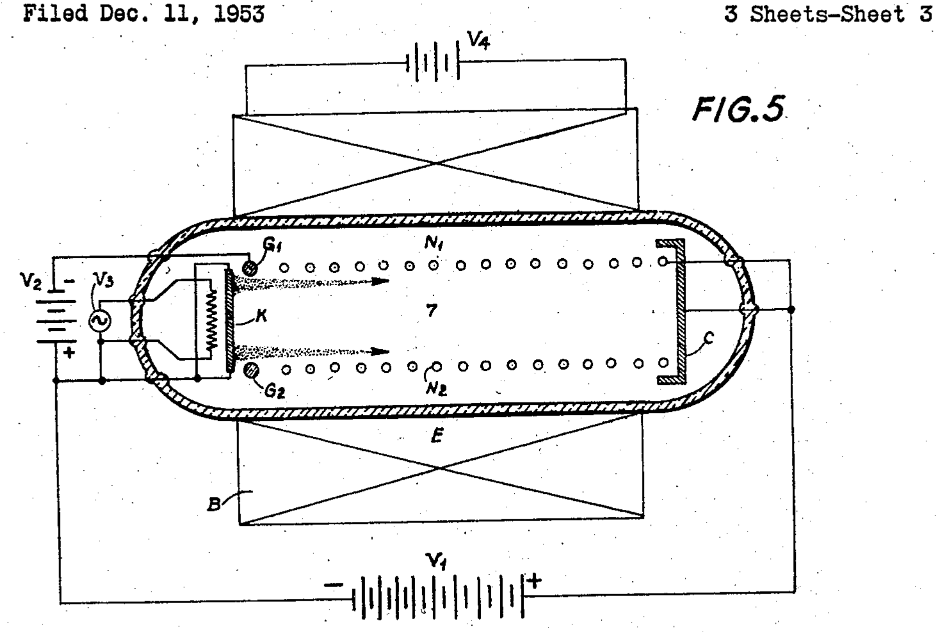
Fig. 5 shows diagrammatically a travelling wave tube provided with a delay line according to Fig. 3.

Fig. 5 shows, in section along the longitudinal axis, an embodiment of an amplifier travelling wave tube. This tube is provided with a delay line according to Fig. 3 which includes two rows of fingers $N_1$ and $N_2$. The tube comprises in a known way a collector C, a cathode K, two bars $G_1$, $G_2$ having a higher potential than the cathode and which ensure the formation of a flat electron beam, and a coil B surrounding the air tight envelope E of the tube. This coil is adapted to create a magnetic field directed along the axis of the tube, and this field contributes to the focusing of the beam. There have also been shown in Fig. 5 the connections of the vacuum tube to the sources of voltage which are necessary for its operation. $V_1$ is the accelerating voltage for the beam and is applied to the collector C and to the delay line. The cathode is at zero potential. A negative voltage $V_2$ is applied to the bars $G_1$ and $G_2$. A source of alternating voltage $V_3$ ensures the heating of the cathode, and a source of direct current voltage $V_4$ is applied to the coil B. The ends of the delay line, which have not been shown, may be made according to methods known in the construction of travelling wave tubes.

Of course the delay line according to the invention may be used with any kind of amplifier or oscillator travelling wave tube.

The tubes of the type shown in Fig. 5 present many advantages over conventional tubes.

The channel or passage-way 7 formed by the apertures provided between the extensions $N_1$ and $N_2$ makes it possible to pass the electron beam through the region where the electromagnetic field is the most intense. This it not possible in the case of known interdigital lines where the beam is adjacent the line. The high frequency energy stored in the line is therefore used to the best advantage, and the coupling between the beam and the line is much closer.

Thus, it is possible to obtain the same gain with a much shorter tube than is the case with tubes using a conventional delay line. This obviously aids the focusing of the beam and permits the use of electron guns of more simple type, i.e. of such as that shown in Fig. 5. These electron guns produce beams of high intensity appropriate to the lines used.

Figure 4:
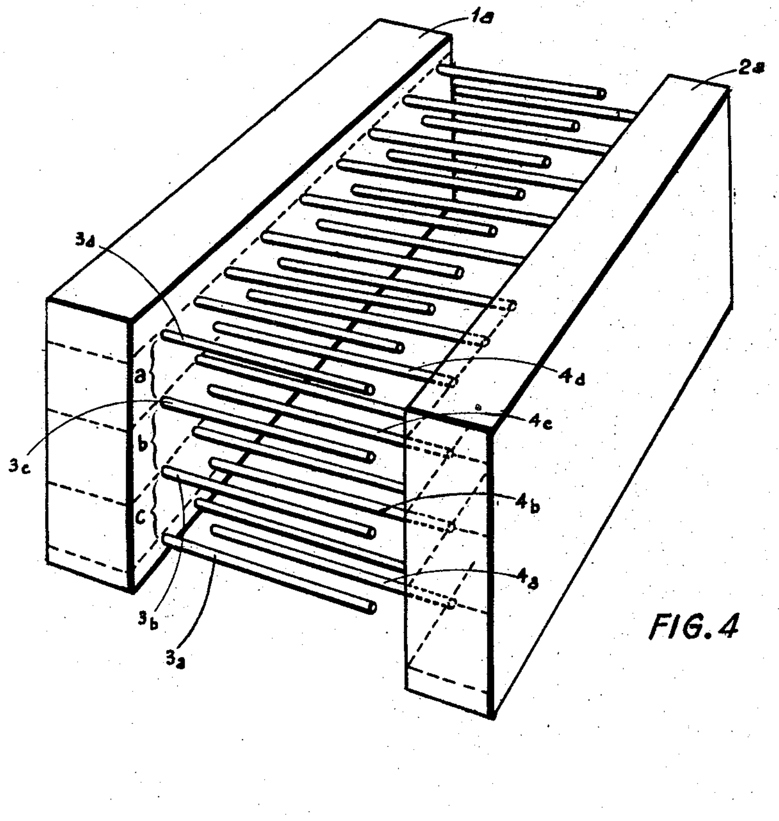
Fig. 4 shows a line in which the fingers each have three apertures according to Figure 2, thereby forming four rows of extensions.

The use of lines having several rows of fingers such as those shown in Fig. 4 permits, by means of several flat beams, an increase in the efficiency.

The finger carrying plates or bodies may be solid and they are readily cooled.

Finally, since the line is short and the focusing is less critical, the guiding of the beam is possible under good conditions for a wide range of voltages applied to the line and to the collector. This property is of particular interest in the case of travelling wave tube oscillators. It is known that these tubes, described for example in copending patent application Serial No. 281,347, filed April 9, 1952, have the feature that their operational frequency may be regulated by varying the accelerating voltage applied to the beam.

What I claim is:

1. A delay line for ultrahigh frequency waves comprising: two identical members each comprising an elongated body having a plurality of extensions perpendicular to said body and constituting respectively along two directions perpendicular to each other at least three rows of extensions, said extensions being spaced from each other along each of said directions by intervals extending over the whole of their respective opposed faces, said two members being positioned with their respective bodies parallel to each other and with their respective extensions interdigitated in uniformly spaced relationship, and the extensions of one member being spaced from the body of the other, whereby at least two linear channels are provided within said delay line.

2. A delay line according to claim 1 wherein said extensions are parallelipipedic.

3. A delay line according to claim 1 wherein there are a plurality of said parallel rows of extensions.

4. In a travelling wave tube of the type comprising a cathode to emit at least one flat electron beam, and a delay line, said delay line comprising: two identical members each comprising an elongated body having a plurality of extensions perpendicular to said body and constituting respectively along two directions perpendicular to each other at least three rows of extensions, said extensions being spaced from each other along each of said directions by intervals extending over the whole of their respective opposed faces, said two members being positioned with their respective bodies parallel to each other and with their respective extensions interdigitated in uniformly spaced relationship, and the extensions of one member being spaced from the body of the other, whereby at least two linear channels are provided within said delay line for the propagation of said at least one flat electron beam, each said linear channel being provided for the propagation of a different electron beam.

5. A delay line for U.H.F. frequency waves comprising supporting plate means, a first chain of at least three elements, said first chain being supported by said plate means at only one end thereof and extending in a predetermined direction in the form of a geometrically periodical structure having delay characteristics for said U.H.F. frequency waves, and at least two further elements also supported by said supporting plate means at only one end thereof and forming with an element of said first chain a second chain extending at right angles to said direction in the form of a geometrically periodical structure having delay characteristics for said U.H.F. waves.

6. A delay line as claimed in claim 5, wherein said supporting plate means is formed by two respective supporting plates, each element of a respective one of said chains being a bar fixed to a respective supporting plate.

7. A delay line as claimed in claim 6, wherein said two supporting plates are parallel plates each with a set of bars disposed to interdigitate therebetween.

8. A multidimensional delay line for ultra-high-frequency waves comprising supporting plate means, a plurality of identical parallel rods, each rod having a free extremity, the other extremity of each of said rods being secured to said supporting plate means in perpendicular relationship, said last-mentioned extremities forming on said plate means, a lattice composed of identical parallelogram-shaped cells.

9. A multidimensional delay line comprising a pair of delay lines as defined in claim 8, wherein said supporting plate means of both of said lines are essentially parallel and spaced from each other by a distance greater than the length of said rods, said rods of both plate means being disposed to interdigitate with each other.

10. A multidimensional delay line for ultra-high-frequency waves comprising supporting plate means, a plurality of parallel rods, each rod having a free end, the other end of each of said rods being secured to said supporting plate means, said last-mentioned extremities forming on said plate means a lattice composed of similar parallelogram-shaped cells.

References Cited in the file of this patent

UNITED STATES PATENTS

| | | |
|---|---|---|
| 2,617,968 | Gutton et al. | Nov. 11, 1952 |
| 2,622,158 | Ludi | Dec. 16, 1952 |
| 2,683,256 | Kumpfner | July 6, 1954 |
| 2,708,236 | Pierce | May 10, 1955 |
| 2,730,678 | Dohler et al. | Jan. 10, 1956 |
| 2,745,984 | Hagelbarger et al. | May 15, 1956 |
| 2,746,036 | Walker | May 15, 1956 |
| 2,770,780 | Warnecke et al. | Nov. 13, 1956 |

FOREIGN PATENTS

| | | |
|---|---|---|
| 691,900 | Great Britain | May 20, 1953 |